United States Patent [19]
Fett

[11] 3,967,101
[45] June 29, 1976

[54] DATA ALIGNMENT CIRCUIT
[75] Inventor: Darrell L. Fett, Scottsdale, Ariz.
[73] Assignee: Honeywell Information Systems, Inc., Phoenix, Ariz.
[22] Filed: Mar. 17, 1975
[21] Appl. No.: 559,115

[52] U.S. Cl. ............................. 235/152; 235/156; 340/172.5
[51] Int. Cl.² ............................................. G06F 7/00
[58] Field of Search ....... 235/152, 156, 164, 92 SH; 340/166 R, 172.5; 307/218

[56] References Cited
UNITED STATES PATENTS

| | | | |
|---|---|---|---|
| 3,374,463 | 3/1968 | Muir | 340/172.5 |
| 3,374,468 | 3/1968 | Muir | 340/172.5 |
| 3,818,203 | 6/1974 | Perlowski et al. | 235/164 |

OTHER PUBLICATIONS

Paul, G. T. et al., *Column Shifter*, In IBM Tech. Disc. Bul. 4(10):, pp. 79–80, Mar. 1962.

Primary Examiner—R. Stephen Dildine, Jr.
Attorney, Agent, or Firm—David A. Frank

[57] ABSTRACT

A data alignment circuit employs a plurality of data selector circuits with each of the data selector circuits including means for receiving a plurality of data bits and control means for selecting one of the bits as an output. Each of the input bits may be connected to respective successive data selector circuits, and the control means of the data selector circuits are interconnected whereby one bit of each data selector circuit is provided in a plural bit output.

6 Claims, 6 Drawing Figures

| D | C | B | A | SHIFT # | $D_0$ | $D_1$ | $D_2$ | $D_3$ | $D_4$ | $D_5$ | $D_6$ | $D_7$ | $D_8$ | $D_9$ |
|---|---|---|---|---|---|---|---|---|---|---|---|---|---|---|
| 0 | 0 | 0 | 0 | 0 | $d_0$ | $d_1$ | $d_2$ | $d_3$ | $d_4$ | $d_5$ | $d_6$ | $d_7$ | $d_8$ | $d_9$ |
| 0 | 0 | 0 | 1 | 1 | $d_{-1}$ | $d_0$ | $d_1$ | $d_2$ | $d_3$ | $d_4$ | $d_5$ | $d_6$ | $d_7$ | $d_8$ |
| 0 | 0 | 1 | 0 | 2 | $d_{-2}$ | $d_{-1}$ | $d_0$ | $d_1$ | $d_2$ | $d_3$ | $d_4$ | $d_5$ | $d_6$ | $d_7$ |
| 0 | 0 | 1 | 1 | 3 | $d_{-3}$ | $d_{-2}$ | $d_{-1}$ | $d_0$ | $d_1$ | $d_2$ | $d_3$ | $d_4$ | $d_5$ | $d_6$ |
| 0 | 1 | 0 | 0 | 4 | $d_{-4}$ | $d_{-3}$ | $d_{-2}$ | $d_{-1}$ | $d_0$ | $d_1$ | $d_2$ | $d_3$ | $d_4$ | $d_5$ |
| 0 | 1 | 0 | 1 | 5 | $d_{-5}$ | $d_{-4}$ | $d_{-3}$ | $d_{-2}$ | $d_{-1}$ | $d_0$ | $d_1$ | $d_2$ | $d_3$ | $d_4$ |
| 0 | 1 | 1 | 0 | 6 | $d_{-6}$ | $d_{-5}$ | $d_{-4}$ | $d_{-3}$ | $d_{-2}$ | $d_{-1}$ | $d_0$ | $d_1$ | $d_2$ | $d_3$ |
| 0 | 1 | 1 | 1 | 7 | $d_{-7}$ | $d_{-6}$ | $d_{-5}$ | $d_{-4}$ | $d_{-3}$ | $d_{-2}$ | $d_{-1}$ | $d_0$ | $d_1$ | $d_2$ |
| 1 | 0 | 0 | 0 | 8 | $d_{-8}$ | $d_{-7}$ | $d_{-6}$ | $d_{-5}$ | $d_{-4}$ | $d_{-3}$ | $d_{-2}$ | $d_{-1}$ | $d_0$ | $d_1$ |
| 1 | 0 | 0 | 1 | 9 | $d_{-9}$ | $d_{-8}$ | $d_{-7}$ | $d_{-6}$ | $d_{-5}$ | $d_{-4}$ | $d_{-3}$ | $d_{-2}$ | $d_{-1}$ | $d_0$ |

Fig-2

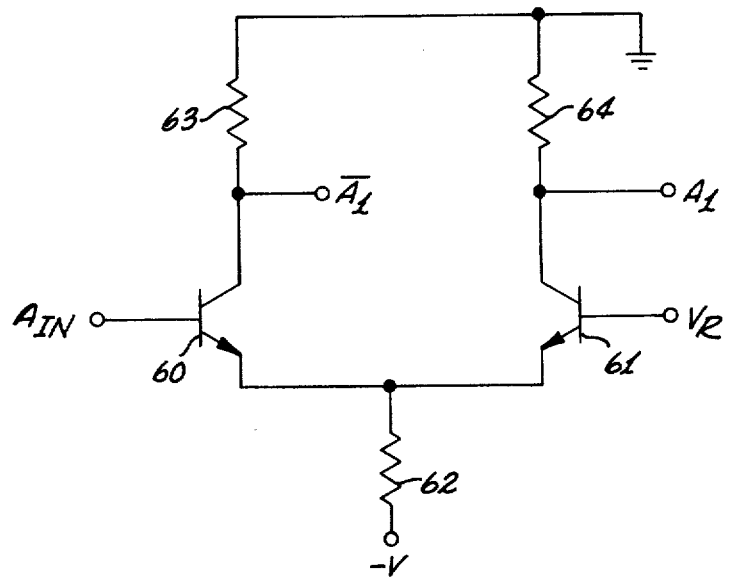
_Fig-4_
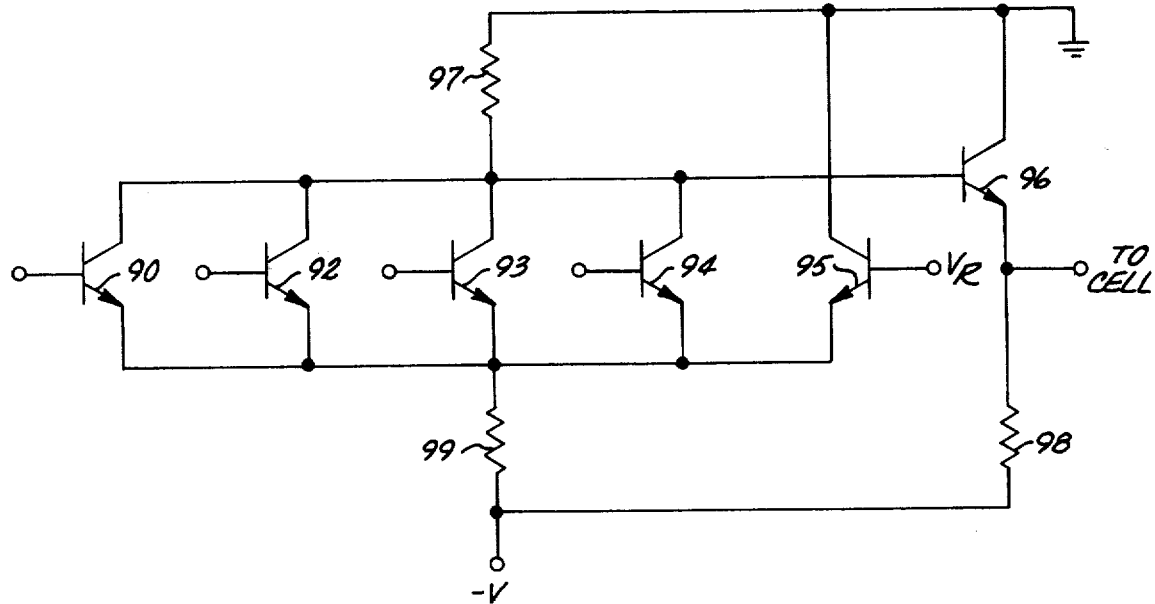
_Fig-5_

DATA ALIGNMENT CIRCUIT

FIELD OF THE INVENTION

This invention relates to digital electronic circuits, and more particularly to circuits for shifting or aligning digital bits.

BACKGROUND OF THE INVENTION

A common operation in digital computer processors is the shifting or aligning of data for arithmetic manipulations. In many machines shift registers are employed for this function wherein bits of data are shifted, either right or left in alignment, one bit position with each clock pulse. Such devices are inherently slow in operation.

Logical shifters have been devised heretofore wherein a plurality of shifts can be accomplished per clock pulse. However, such shifters typically require considerable power and complex circuitry.

SUMMARY OF THE INVENTION

An object of the present invention is an improved data alignment circuit.

Another object of the invention is improved means for shifting bits logically.

Still another object of the invention is logical data shifting means which allows enhanced performance and circuit density with reduced power requirements.

In accordance with the invention a data alignment circuit includes a plurality of data selector circuits with each of the data selector circuits including means for receiving a plurality of bits and control means for selecting one of the bits as an output. Each of the input bits is connected to respective successive data selector circuits, and the control means of the data selector circuits are interconnected whereby one bit of each data selector circuit is provided in a plural bit output. Actuation means is connected to the data selector circuit control means whereby the plural bit output is provided by selecting one bit from each of the plurality of data selector circuits.

More particularly, each data selector circuit comprises a plurality of cells each having a pair of bipolar transistors connected with common emitters. An input data bit is connected to the base of a first transistor of each pair and a reference voltage is connected to the base of a second transistor of each pair. A third transistor in each cell switchably connects the common emitters to a current source. A voltage potential terminal is connected to the collector of the first transistor and an output terminal is connected to the collector terminal of the second transistor, with resistive means connecting the voltage potential terminal and the output terminal.

When a cell of a data selector circuit is actuated by the third transistor of the cell switching the common emitters to the current source, a "0" or a "1" is provided at the output terminal depending on the data bit at the base of the first transistor in the cell.

The invention and objects and features thereof will be more fully understood from the following detailed description and appended claims when taken with the drawings.

BRIEF DESCRIPTION OF THE DRAWINGS

FIG. 2 is a truth table of data outputs for a logical code controlling the data alignment circuit of FIG. 1;

FIG. 4 is an electrical schematic of a control buffer which may be employed in the data alignment circuit of FIG. 1;

FIG. 5 is an electrical schematic of a decoder circuit which may be employed in the data alignment circuit of FIG. 1.

DETAILED DESCRIPTION OF A PREFERRED EMBODIMENT

Figure 1:
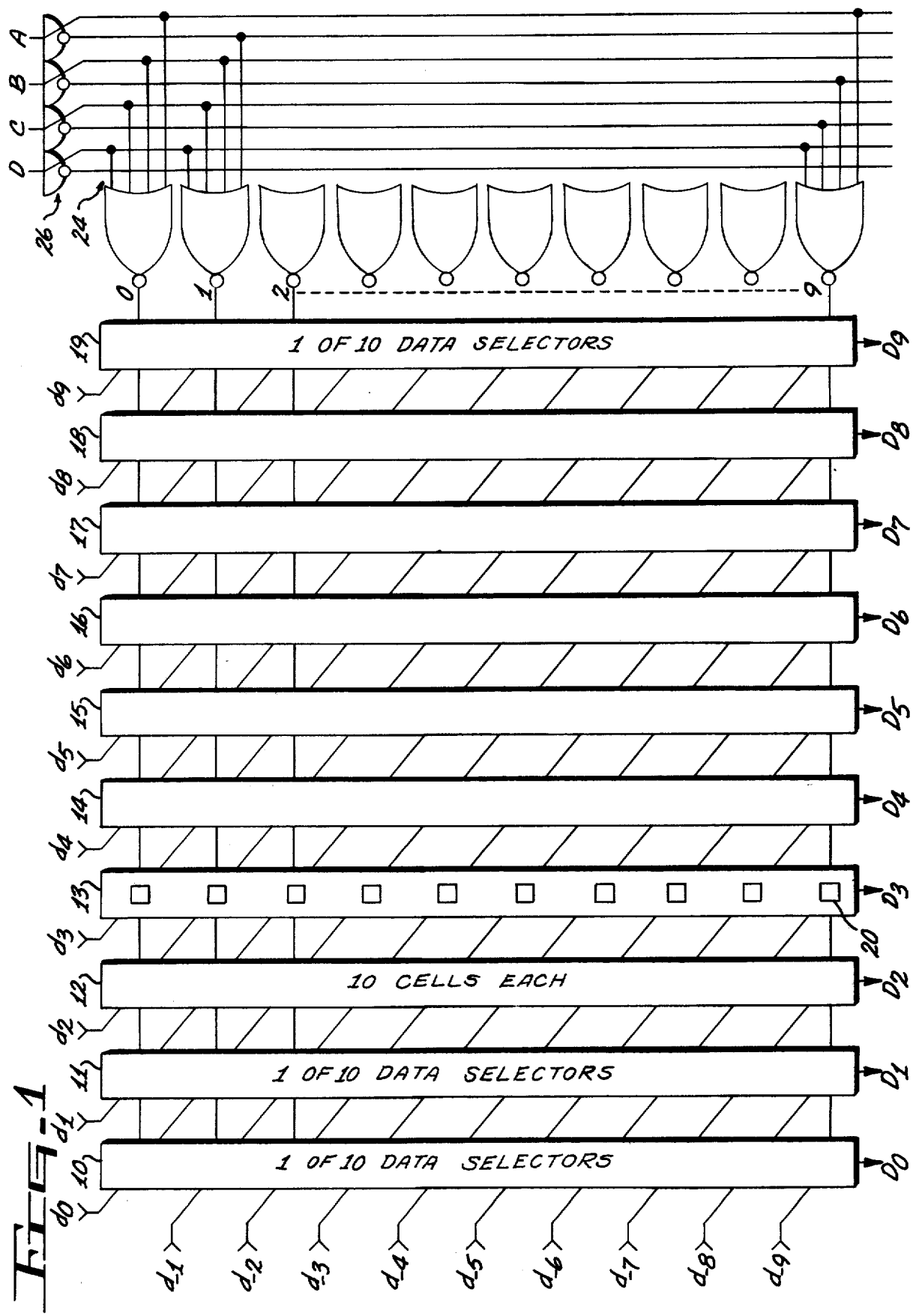
FIG. 1 is a functional diagram of a data alignment circuit in accordance with the present invention.

Referring now to the drawings, FIG. 1 is a functional diagram of a data alignment circuit in accordance with the present invention. The data alignment circuit comprises a plurality of data selector circuits 10–19. Each data selector circuit comprises a plurality of cells each receiving a bit of data, as will be more fully described hereinbelow with reference to FIG. 3. Applied as inputs to the data selector circuits 10–19 are a plurality of data inputs $d_0$–$d_9$ shown horizontally across the top of the data selector circuits, and a plurality of data inputs $d_{-1}$–$d_{-9}$ shown vertically as inputs to the data selector circuits. It will be noted that a data bit input to one data selector circuit is also applied as a data input to the succeeding data input circuit but at a different cell level within the succeeding data selector circuit, as illustrated by the diagonal lines. For illustrative purposes cells 20 are shown in data selector circuit 13 with inputs provided by data input $d_3$, $d_2$, $d_1$, $d_0$, $d_{-1}$, $d_{-2}$, $d_{-3}$, $d_{-4}$, $d_{-5}$ and down to $d_{-6}$.

Each of the data selector circuits 10–19 includes control means whereby one bit of each data selector circuit may be provided in the output from the data selector circuits, shown as $D_0$–$D_9$. Actuation means 24 in the form of a logic decoder serves to actuate one cell in each data selector circuit in accordance with a logic code applied thereto by buffer 26. The inputs to buffer 26 are labeled A, B, C, and D with the A input being the least significant bit.

To simplify the illustration all data input connections are not illustrated, but it will be observed that the data bit inputs are connected diagonally from upper left to lower right to cells in the data selector circuits, and the control lines from actuation means 24 are connected horizontally to cells in each of the data selector circuits. Thus, in accordance with a binary code applied through buffer 26 to the decoder and acutator 24, cells in the data selector circuits aligned horizontally are controlled to provide the data bit outputs $D_0$–$D_9$.

FIG. 2 is a truth table for binary inputs A, B, C, D, and showing the corresponding shift of the input bits. The righthand portion of the table gives the outputs $D_0$–$D_9$ in terms of the input data bits for the corresponding shift. Thus, for a 0 shift, corresponding to an ABCD code of 0000, the data bits $d_0$–$d_9$ are provided at the outputs $D_0$–$D_9$. For a 5-bit shift, for example, the ABCD code is 1010 and the outputs are $d_{-5}$ through $d_4$, as shown in the table.

Because of the particular connection of the input data bits to the data aligment circuit of FIG. 1 all shifts of data are to the right. It will be appreciated, however, that a left shifter, a right data rotator, or a left data rotator may be provided by altering external connections or logical gating of appropriate data sources. Further, shift organization is such that expansion to a greater number of bits is easily accomplished. For example, to obtain a left shifter the input/output ordering or bit position designation is changed from $d_0$ through $d_9$ to $d_0$ through $d_{-9}$. To provide a bit rotation function the data inputs provided horizontally at the top from left to right are also provided as the vertical inputs from bottom to top, thus providing a rotation of bit positions as various cells in the data selector circuits are actuated.

Figure 3:
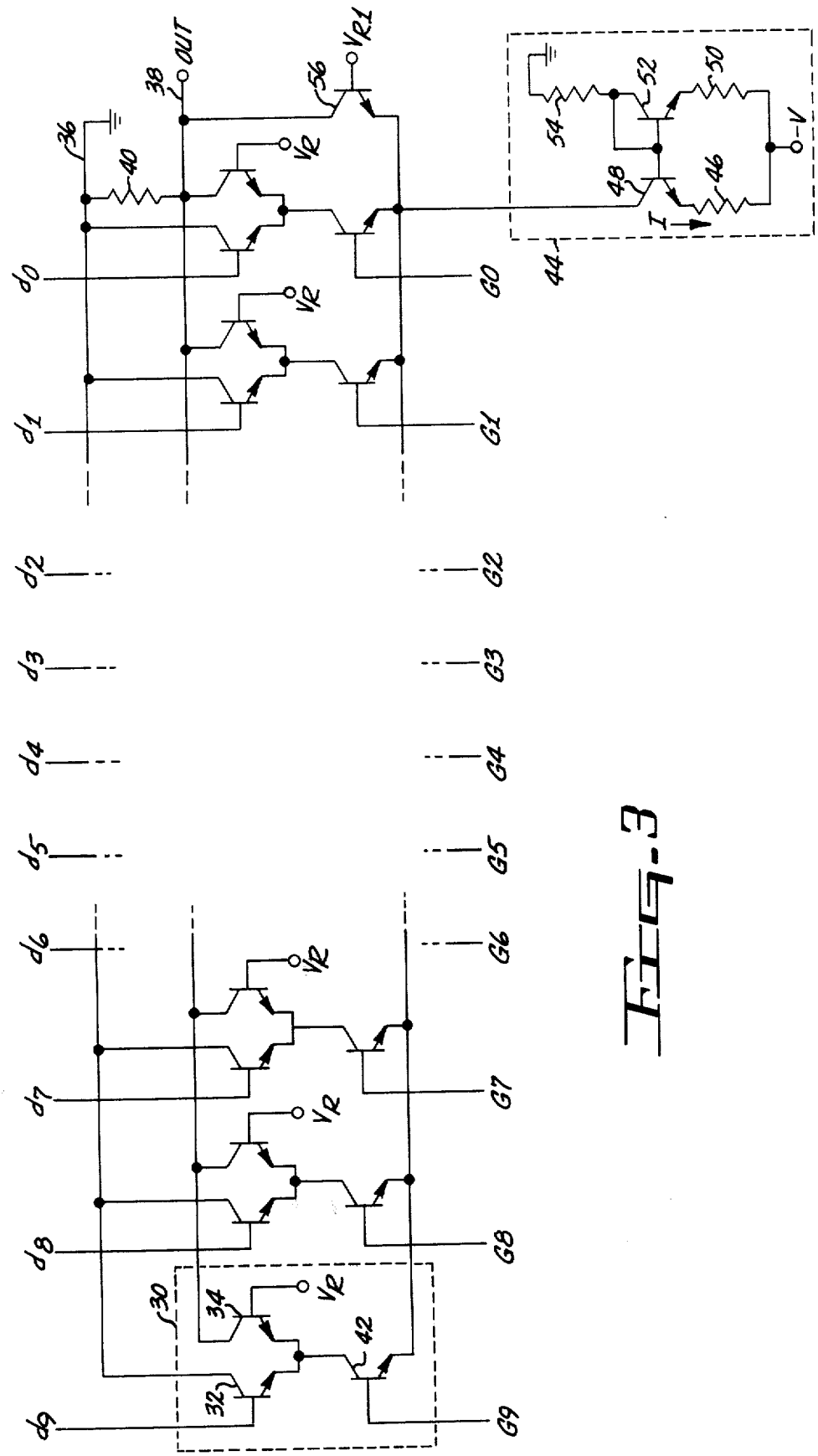
FIG. 3 is an electrical schematic of a data selector circuit in accordance with the present invention as used in the alignment circuit of FIG. 1.

FIG. 3 is an electrical schematic of a data selector circuit as used in the alignment circuit of FIG. 1. Each cell 30 includes a pair of transistors 32 and 34 connected with common emitters. A reference voltage, $V_R$, is applied to the base of transistor 34 and an input data bit ($d_0$ herein) is applied to the base of transistor 32. The collector of transistor 32 is connected to a circuit ground potential terminal 36, and the collector of transistor 34 is connected to an output terminal 38. Resistor 40 interconnects the circuit ground potential 36 and the output terminal 38. A third transistor 42 in cell 30 switchably connects the common emitters of transistors 32 and 34 to a current source shown generally at 44. Current is provided from voltage source, $-V$, through resistor 46 and transistor 48, with bias potential for the base of transistor 48 being provided by the serial circuit comprising resistor 50, transistor 52, and resistor 54. Transistor 56 is connected between current source 44 and the output terminal 38 and functions merely to provide a "0" or $-0.5V$ output when all cells of the data selector circuit are turned off. The base bias, $V_{R1}$, on transistor 56 is $-1.0$ volt for a voltage potential, $-V$, of $-3.3$ volts.

It will be appreciated that transistor 56 is not essential to the operation of the data selector circuit, but is included for convenience where operation of the circuit may include having no cells connected to the current source 44. Further, while a regulated current source 44 is illustrated, the selector circuit may employ a simple resistive means interconnecting each cell to the voltage source, $-V$.

In operation, if a control signal G9 actuates transistor switch 42 by the application of a positive base bias, then the emitters of transistors 32 and 34 are connected to the current source 44, and current will flow through either transistor 32 or transistor 34 depending on which transistor base has the most positive base bias potential. Assuming an embodiment where a logic "0" is represented by $-0.5$ volt and a logic "1" is represented by 0.0 volt, then with $-0.5$ volt (logic "0") applied to the base of transistor 32, current flows through transistor 34 through resistor 40 to ground, and by a proper selection of the value of resistor 40 vis-a-vis current source 44 an output voltage of $-0.5$ is present at the output terminal, which corresponds to the $-0.5$ volt applied as the logic "0" input to the base of transistor 32. Conversely, if a logic "1" is applied to the base of transistor 32 then current flows through transistor 32 directly to ground with no current flowing through resistor 40. Thus the output voltage is 0.0 volt which corresponds to the "1" or 0.0 volt applied to the base of transistor 32.

FIG. 4 is an electrical schematic of a buffer which may be utilized in the data alignment circuit of FIG. 1 to give a positive indication of either the real (A) or complement ($\overline{A}$) of an input signal $A_{in}$. Two NPN transistors 60 and 61 are connected with common emitters through resistor 62 to a negative voltage potential $-V$. Resistors 63 and 64 respectively connect the collectors of transistors 60 and 61 to ground potential. A reference voltage, $V_r$ (e.g. $-0.26V$) is applied to the collector of transistor 61 and the input signal $A_{in}$ is applied to the collector of transistor 60. When $A_{in}$ is a "0" (e.g. $-0.5V$) transistor 60 is cut off and a high voltage potential (0.0V) is present at the $\overline{A}$ output terminal taken at collector of transistor 60. Transistor 61 is conductive and output A taken at the collector of transistor 61 represents a "0" or e.g. $-0.5V$. Conversely, when $A_{in}$ is a "1" (e.g. 0.0V), transistor 60 is conductive and the $\overline{A}$ output is at a "0" or $-0.5V$. Transistor 60 is rendered nonconductive by the rise in voltage potential on its emitter and the output A is a "1" (e.g. 0.0V potential). Thus, a positive indication of either A or $\overline{A}$ is obtained from the buffer of FIG. 4.

A decoder for use in the data alignment circuit of FIG. 1 is illustrated schematically in FIG. 5 wherein transistors 90–94 are connected in parallel and function as a NOR gate. By connecting the complement of the address code for a particular control line to the inputs of transistors 90–94, transistor 96 is rendered conductive and the output of the emitter-follower circuit defined by transistor 96 and resistor 98 is positive (e.g. 0V). If any one input to the collectors of transistors 90–94 is a "1" transistor 96 is rendered less conductive and the output is a "0". Transistor 95 with a reference voltage $V_r$ (e.g. $-0.26V$) is connected between ground and the emitters of transistors 90–94 to insure that all transistors are rendered nonconductive in the absence of a "1" input thereto. Thus, transistor 96 is biased to conduct and provide a "1" output so long as each of transistors 90–94 is nonconductive.

Figure 6:
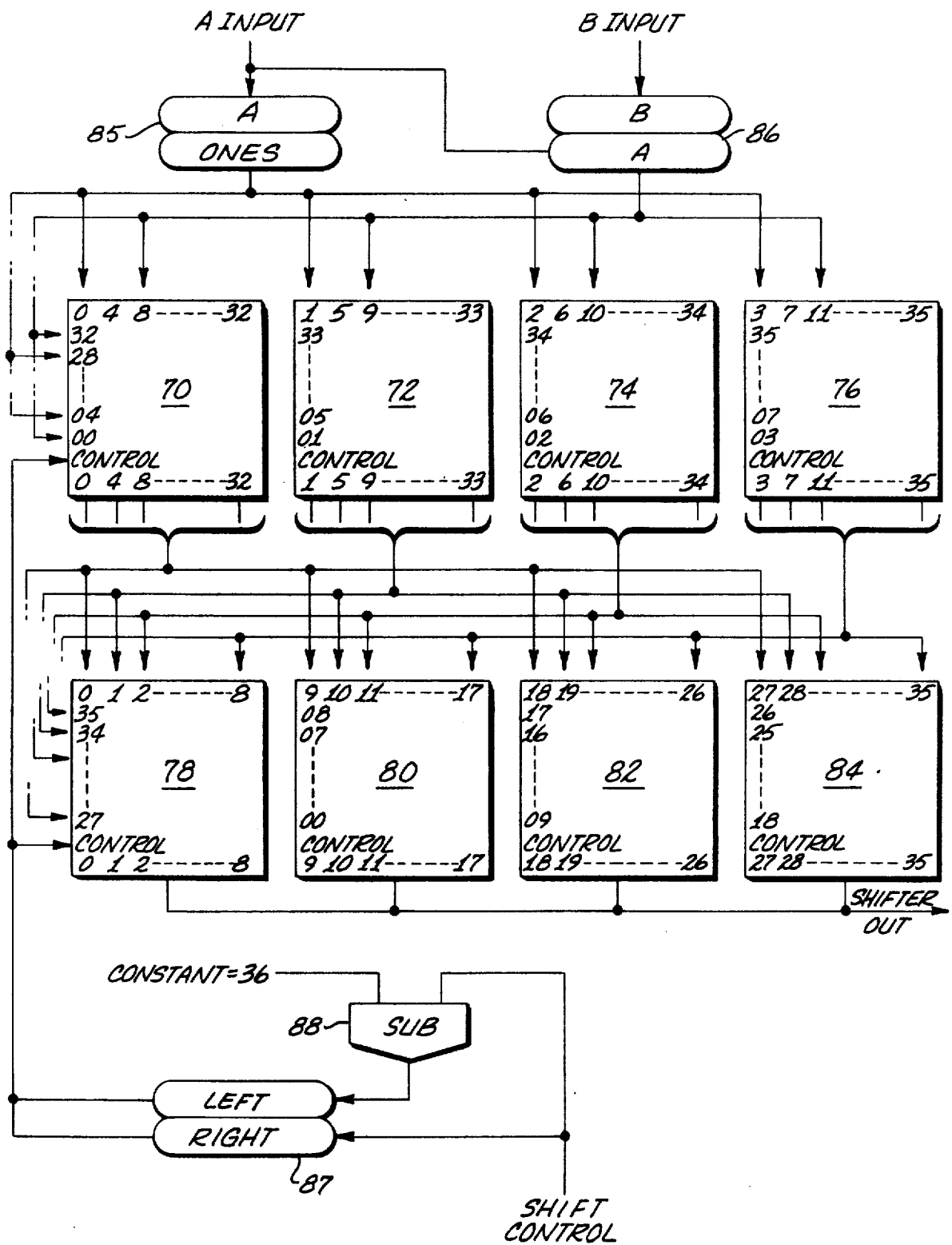
FIG. 6 is a functional diagram of a 36-bit left-right shifter in accordance with the present invention.

By interconnecting a plurality of data alignment circuits as shown in FIG. 1 various data shifting arrangements may be achieved. Consider now the shifter network of FIG. 6 which may be employed as a left or right shifter/rotator for a 36-bit input word. In this embodiment each of the data alignment circuits 70, 72, 74, 76, 78, 80, 82 and 84 comprise 9 data selector circuits each having 9 cells. The alignment circuit 70, 72, 74, and 76 perform a modulo 4 shift by connecting input bits, 0, 4, 8, – – – 32 to the 9 inputs of network 70 (as shown), inputs bits 1, 5, 9 – – – 32 to network 72, data inputs 2, 6, 10 – – – 34 to network 74, and data bit inputs 3, 7, 11 – – – 35 to network 76. Thus, with this connection of inputs each shift in the networks 70–76 provides a modulo 4 or 4 bit shift in position of the input bit. Each of the networks 70–76 has outputs corresponding in number to the input bits (i.e. network 70 has outputs labeled 0, 4, 8 – – – 32) and each of these outputs is connected to a corresponding numbered input of networks 78, 80, 82, and 84 whose inputs are connected to provide a single bit shift. Thus, shifts from 0 to 36 in multiples of 4 may be achieved with the networks 70, 72, 74, 76; whereas shifts of 0–3 may be achieved with networks 78, 80, 82, and 84 thereby achieving a continuous shift or from 0 to 36 bit positions by selectively actuating the modulo 4 networks 70–76 and the modulo 1 networks 78–84.

In this embodiment switch 85 provides either an A word input or all ones (indicating a positive sign bit) while switch 86 provides either the A word input or a B word input. Thus, the 72 inputs to the data alignment circuit can be loaded with word A from switches 85 and 86, thus functioning as a rotator for word A, or either word A or word B can be loaded from switch 86 with sign bits loaded also. If a positive sign bit is required, this is loaded from the ones in switch 85, while a negative sign bit (all zeros) may be provided by disconnecting the input from switch 85. Alternatively, words A and B can both be loaded for a double word shift operation.

A shift control signal is provided to switch 87 for left and right shifts. A left shift of a 36-bit word may be accomplished by subracting the desired left shift from 36 in subtracter 88 and performing a right shift of the difference. For example, a desired left shift of 4 may be effected by shifting the input bits right by 36 minus 4 or 32 places. Such an application is employed in copending application Ser. No. 562,317 filed Mar. 26, 1975.

The data alignment circuit in accordance with the present invention is operationally fast and has relatively low power requirements. The circuit lends itself to high density integration and is easily expandable. While the invention has been described with reference to specific embodiments, the description is illustrative and is not to be construed as limiting the invention. Various modifications and applications may occur to those skilled in the art without departing from the spirit and scope of the invention as defined by the appended claims.

I claim:

1. Means for shifting a plurality of data bits in alignment comprising:

A. an ordered plurality of data selector circuits, each of said data selector circuits comprising:
  1. a current source;
  2. an ordered plurality of cells, each of said cells comprising further:
    a. a pair of bipolar transistors connected with common emitters;
    b. means for connecting a respective bit of said plurality of data bits to the base of a first transistor of said pair;
    c. a third transistor switchably connecting said common emitters to said current source;
  3. a reference voltage potential terminal connected to the base of each of said second transistors;
  4. a voltage potential terminal connected to the collector of each of said first transistors;
  5. an output terminal connected to the collector of each of said second transistors;
  6. resistive means connecting said voltage terminal to said output terminal;
  7. means for connecting the base of the first transistor of each of said pairs to the base of the first transistor of said pairs in the successive cell in the successive data selector circuit;
  8. first means for connecting the base of each of said third transistors of each cell to the base of each third transistor of respective cells in successive data selector circuits;

B. actuation means connected to said first means for enabling only one of said cells of each of said data selector circuits to transmit selected data bits as a plural bit output;

C. control means connected to said actuation means for determining which of said data bits are to be selected as said plural bit output.

2. Means for shifting data bits as defined by claim 1 wherein said actuation means comprises logic decode circuitry for actuating one of said third transistors in each data selector circuit, said actuated third transistors allowing the data bits connected to the corresponding cells to be transmitted to said ouput terminals of said data selector circuits.

3. Means for shifting data bits as defined by claim 2 wherein said logic decode circuitry comprises a first plurality of transistors having emitter and collector terminals connected in parallel, a first transistor with emitter connected to the emitters of said first plurality of transistors and a collector connected to a first voltage terminal, resistive means connecting said first voltage terminal to said collectors of said first plurality of transistors, resistive means connecting the emitters of said first plurality of transistors and said first transistor to said second voltage terminal, a second bipolar transistor, conductive means connecting the collector of said second transistor to said first voltage terminal, resistive means connecting the emitter of said second transistor to said second voltage terminal, conductive means connecting the base of said second transistor to the collectors of said first plurality of transistors, and output means connected to the emitter of said second transistor, conductive means connecting the base of said first transistor to a third voltage terminal.

4. A circuit for receiving a plurality of bits of data and transmitting one of said bits as an output in response to a bit selection signal comprising a plurality of cells each for receiving a data bit, each cell having a pair of bipolar transistors connected with common emitters, means for connecting a data bit to the base of a first transistor of each pair and reference voltage means to the base of the second transistor of each pair, a current source, a third transistor in each cell switchably connecting said common emitters to said current source, a voltage potential connected to the collector of said first transistor, an output terminal connected to the collector terminal of said second transistor, and resistive means connecting said voltage potential terminal to said output terminal.

5. A circuit as defined by claim 4 wherein said current source comprises a first bipolar transistor with emitter and collector connected respectively through resistive means to first and second voltage terminals, conductive means interconnecting said base and collector terminals of said first transistor, a second bipolar transistor, resistive means connecting the emitter of said second transistor to said first voltage terminal, means connecting the collector terminal of said second transistor to said plurality of cells, and conductive means interconnecting said base of said first tranistor and the base of said second transistor for providing bias control to the base terminal of said second transistor.

6. A circuit as defined by claim 4 wherein said current source comprises a second voltage potential and resistive means connecting said second voltage potential to said third transistor in each cell.

* * * * *